US006186711B1

(12) United States Patent
Mueller

(10) Patent No.: US 6,186,711 B1
(45) Date of Patent: Feb. 13, 2001

(54) ENGRAVING SYSTEM

(75) Inventor: Michael A. Mueller, Phoenix, AZ (US)

(73) Assignee: Axxess Technologies, Inc., Tempe, AZ (US)

( * ) Notice: Under 35 U.S.C. 154(b), the term of this patent shall be extended for 0 days.

(21) Appl. No.: 09/054,417

(22) Filed: Apr. 3, 1998

(51) Int. Cl.[7] .......... B23C 1/06

(52) U.S. Cl. .......... 409/132; 269/292; 269/294; 269/309; 408/87; 409/174; 409/212; 409/225

(58) Field of Search .......... 409/212, 225, 409/219, 221, 174, 163, 132, 164, 159; 269/309, 294, 293, 292; 408/87, 103

(56) References Cited

U.S. PATENT DOCUMENTS 2,034,240 * 3/1936 Kremer et al. .......... 409/109
2,182,551 * 12/1939 Edwards .......... 409/174
2,646,725 * 7/1953 Brynildsrud .......... 409/109
2,801,555 * 8/1957 Freeland et al. .......... 409/225
4,645,391 * 2/1987 Fallert .......... 409/225
4,664,366 * 5/1987 Lane et al. .......... 269/303
4,688,974 * 8/1987 Wright et al. .......... 409/219
4,794,687 * 1/1989 Peters et al. .......... 409/225
4,834,595 * 5/1989 Cacciotti .......... 409/84
4,928,939 * 5/1990 Bell et al. .......... 269/309
4,993,895 * 2/1991 Nordstrom .......... 408/103
5,020,201 * 6/1991 Kitamura .......... 409/219
5,056,391 * 10/1991 Stewart .......... 83/139
5,064,321 * 11/1991 Barnes .......... 409/219
5,065,991 * 11/1991 Schneider .......... 269/309
5,158,487 * 10/1992 Varnau .......... 409/219
5,403,131 * 4/1995 Susnjara .......... 409/219
5,415,384 * 5/1995 Obrist et al. .......... 269/309
5,429,461 * 7/1995 Mukherjee et al. .......... 409/219
5,569,003 10/1996 Goldman et al. .
5,575,318 * 11/1996 Susnjara .......... 409/212
5,611,650 * 3/1997 Perkins et al. .......... 409/219
5,743,685 * 4/1998 Piggott .......... 409/225
5,897,275 * 4/1999 Sella .......... 409/225
5,918,870 * 7/1999 Stark .......... 269/309

* cited by examiner

*Primary Examiner*—Daniel W. Howell
(74) *Attorney, Agent, or Firm*—Finnegan, Henderson, Farabow, Garrett & Dunner, L.L.P.

(57) ABSTRACT

An engraving system for positioning a workpiece to be engraved. The workpiece is held in a workpiece carrier having a positioning structure that engages a complementary positioning structure on an engraving table. The workpiece is centered in the workpiece carrier so that when the workpiece carrier is in position on the engraving table, the center of the workpiece is known to the engraving system. This engraving system allows for an unskilled operator to engrave workpieces of different configurations in a reliable manner.

26 Claims, 7 Drawing Sheets

ENGRAVING SYSTEM

BACKGROUND OF THE INVENTION

The present invention relates generally to the field of engraving. More particularly, the invention relates to a system and method for positioning a workpiece to be engraved in an engraving apparatus.

A problem in the field of engraving is the lack of skilled engravers available to perform engraving operations. This is particularly apparent in jewelry and variety stores, where customers often desire to purchase personally engraved items. To engrave an item with the currently available engraving equipment, the stores must have an employee available who is skilled in the art of engraving, including positioning the item for engraving and performing the actual engraving.

Positioning the item for engraving requires skill to ensure that the workpiece is aligned correctly under the engraver and that the workpiece is firmly clamped into place so that the workpiece will not move while it is being engraved. If the workpiece shifts during the engraving operation, the workpiece will likely be ruined and the operator would be forced to start over with a new workpiece. The experience required to gain workpiece positioning skill was typically learned by trial and error. Thus, experienced people are hard to find, and training new people is time-consuming and expensive.

There are vending machines that can automatically position and engrave a selected workpiece. Such vending machines require no engraving experience to operate. However, these machines have a large footprint, taking up much floor space and making them impractical to operate in small jewelry and variety stores. An engraving machine that is inexpensive to manufacture, easy to operate, and compact enough to fit on a table top would best fit the needs of the smaller stores.

In light of the foregoing, there is a need for an engraving system that reduces the skill needed by an operator to engrave a workpiece and that is compact in size.

SUMMARY OF THE INVENTION

Accordingly, the present invention is directed to an engraving system that substantially obviates one of more of the limitations and disadvantages of prior art engraving systems. The advantages and purposes of the invention will be set forth in part in the description which follows, and in part will be obvious from the description, or may be learned by practice of the invention. The advantages and purposes of the invention will be realized and attained by the elements and combinations particularly pointed out in the appended claims.

To attain the advantages and in accordance with the purposes of the invention, as embodied and broadly described herein, the present invention is directed to an engraving system to position selected workpieces for engraving. The engraving system comprises an engraving table having a first positioning structure. A workpiece carrier is provided for each respective workpiece of a different configuration. Each workpiece carrier includes a second positioning structure that is engagable with the first positioning structure to position the workpiece in a predetermined position. An engraver is provided to engrave the workpiece positioned on the engraving table.

In another aspect, the invention is directed to a method of positioning a workpiece in an engraving system. The method includes the steps of securing the workpiece to be engraved into a workpiece carrier having a first positioning structure and then centering the workpiece in the engraving system by engaging the first positioning structure of the workpiece carrier with a second positioning structure in an engraving table.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention. In the drawings.

DETAILED DESCRIPTION

Reference will now be made in detail to the present preferred embodiment of the invention, an example of which is illustrated in the accompanying drawings. Wherever possible, the same reference numbers will be used throughout the drawings to refer to the same or like parts.

In accordance with the present invention, an engraving system to position selected workpieces for engraving includes an engraving table. A means is provided for positioning the workpiece into a predetermined engraving position on the table. Preferably, the engraving table is provided with a first positioning structure and the workpiece is held in a workpiece carrier having a second positioning structure. The second positioning structure is engagable with the first positioning structure to position the workpiece in a predetermined engraving position. Consequently, there is no skill required in positioning different workpieces that are to be engraved.

While the disclosed embodiment uses an engraving table to support the workpiece, it is contemplated that a drawer-type mechanism would function equally as well. In a drawer-type mechanism, a workpiece carrier holding a workpiece could be secured in the drawer bottom before the drawer was closed. The drawer would be provided with a positioning structure.

Figure 1:
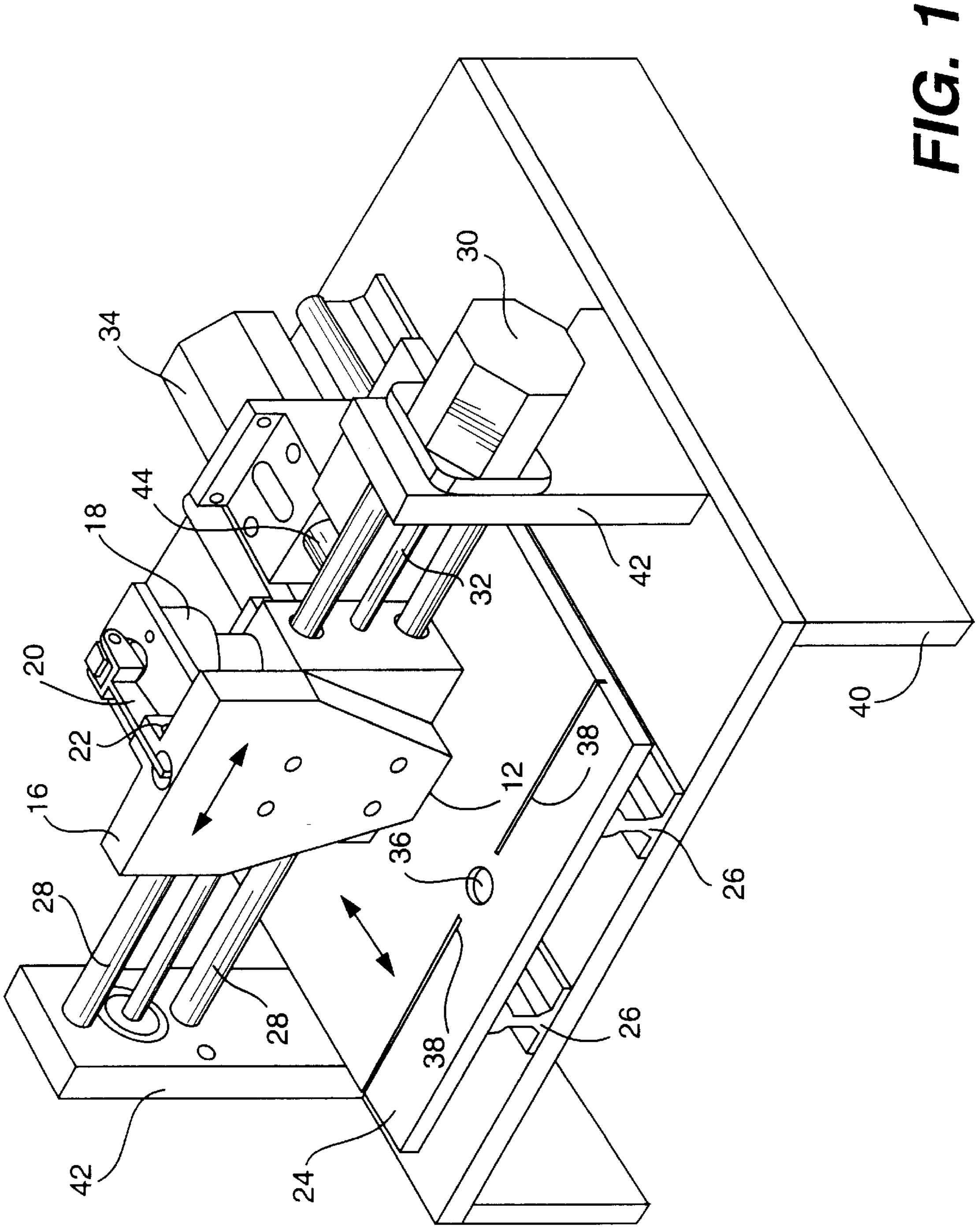
FIG. 1 is a perspective view of an engraving system of the present invention.

As embodied herein and shown in FIG. 1, the engraving system includes an engraver 12 and an engraving table 24.

The engraver 12 is contained within a housing 16 that is mounted on two guides 28. The guides 28 are supported by two vertical support members 42 that rest on stand 40.

A stepper motor 30 is mounted on one of the support members 42. The stepper motor 30 is connected to a lead screw 32, which engages housing 16. The stepper motor 30 turns the lead screw 32, thereby causing the housing 16 and engraver 12 to move along guides 28 in the X-direction. The X-direction engraving motions are accomplished in this manner.

Figure 2:
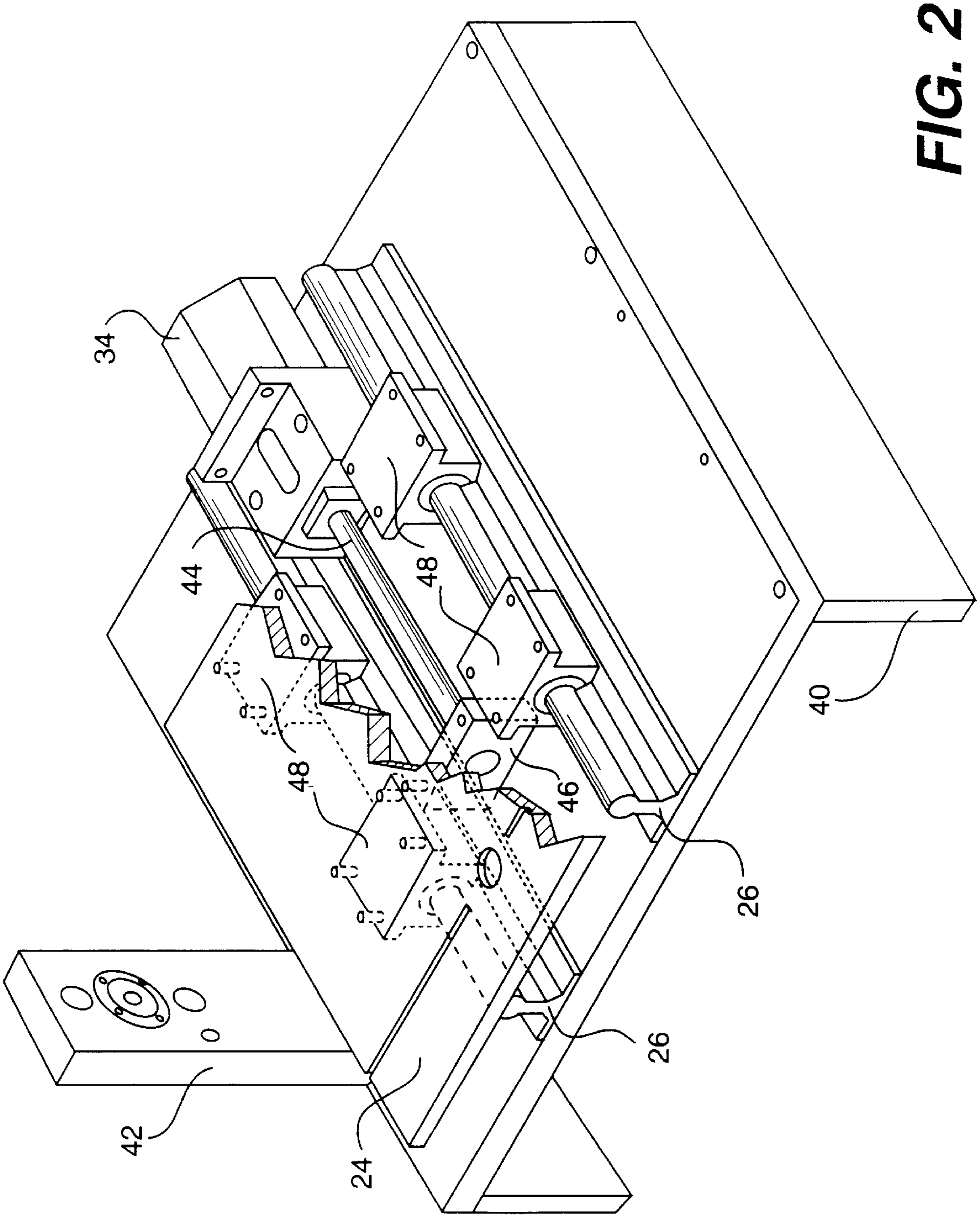
FIG. 2 is a cut-away view illustrating the support structure of the engraving table of the present invention.

An engraving table 24 is positioned beneath the engraver 12 and between the vertical support members 42. As shown in FIG. 2, the engraving table 24 has four sliding supports 48 that are slidably engaged with two support rails 26. The support rails 26 rest on stand 40.

The engraving table 24 has a structure 46 that is engaged with lead screw 44. The lead screw 44 is turned by stepper motor 34, thereby moving the engraving table 24 along the support rails 26 in the Y-direction. The stepper motor 34 can be used to move the engraving table 24 from a loading position to an engraving position. Additionally, the stepper motor 34 can be used to move the engraving table 24 and attached workpiece in the Y-direction when the engraver is in contact with the workpiece to accomplish the Y-direction engraving motions.

Figure 3:
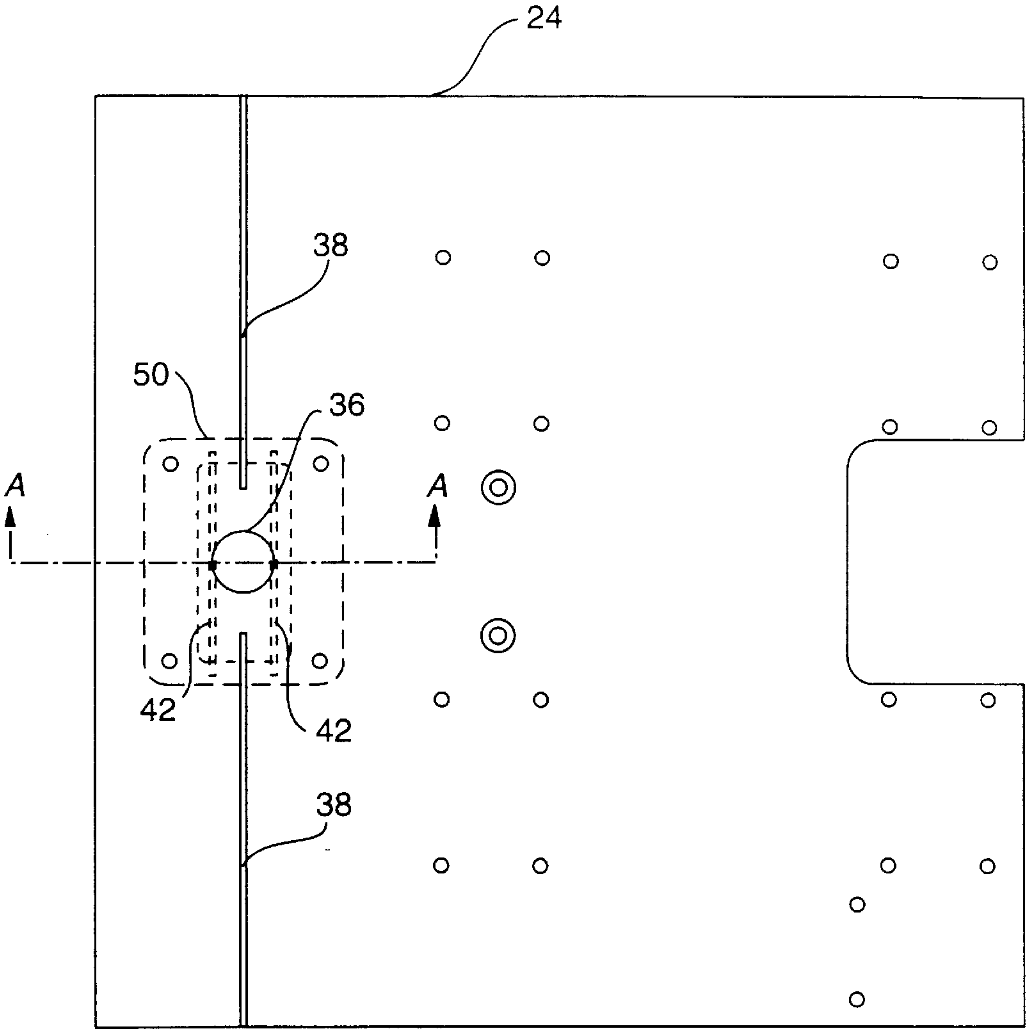
FIG. 3 is top view of the engraving table of the present invention.
Figure 4:
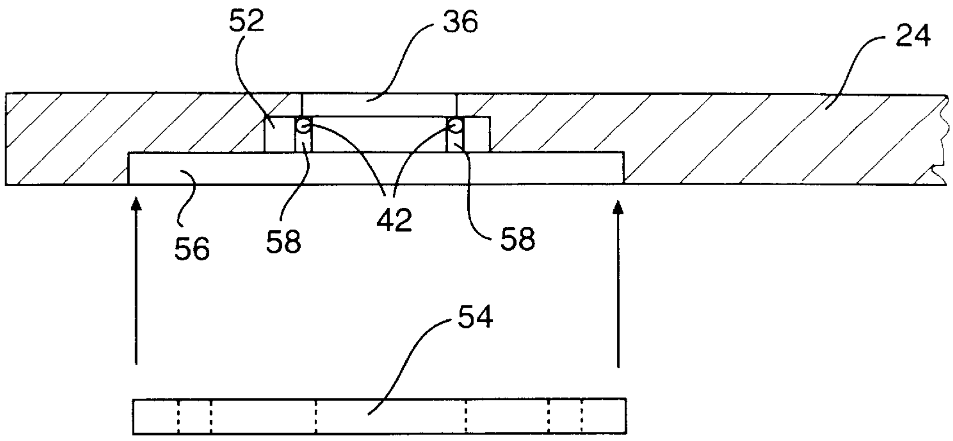
FIG. 4 is a cross-sectional view taken along line A—A of FIG. 3.

In accordance with the present invention, the engraving table includes a first positioning structure. As best illustrated in FIG. 3, the first positioning structure of the engraving table 24 of the exemplary embodiment comprises a circular opening 36. As shown in FIG. 4, the opening 36 extends through the engraving table 24.

As best illustrated in FIG. 3, spring pins 42 are mounted within the engraving table 24 and intersect the opening 36. As shown in FIG. 4, the spring pins 42 are positioned in vertical slots 58. A cover 54 engages a relief 56 on the bottom side of the engraving table 24 to hold spring pins 42 in place. An open area 52 is provided around the spring pins 42.

In accordance with the present invention, the engraving system includes a workpiece carrier for holding a workpiece. The workpiece carrier has a second positioning structure that engages the first positioning structure on the engraving table to position the workpiece in a predetermined engraving position. In the presently preferred and disclosed embodiment, the second structure is a boss centered on the workpiece carrier so that when the boss engages the opening, the workpiece carrier is centered over the opening. If the workpiece is centered on the workpiece carrier, then the workpiece will also be centered over the opening. This system provides for the centering of workpieces of different configurations held in workpiece carriers of different configurations with no operator skill required.

Figure 7:
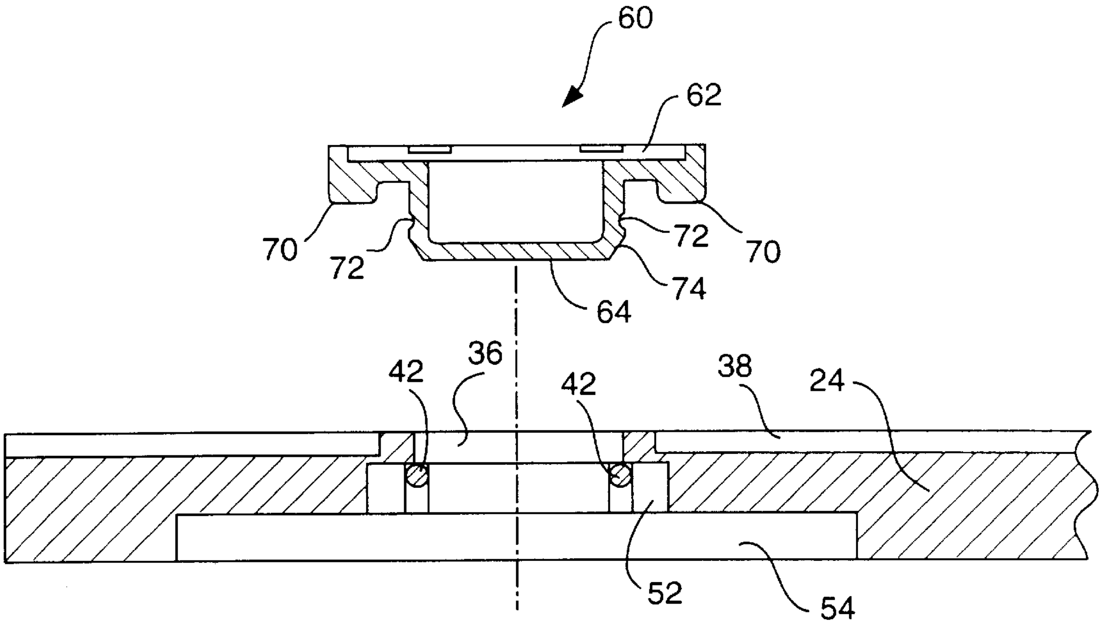
FIG. 7 is a cross-sectional view of the workpiece carrier positioned above the engraving table.

As shown in FIG. 7, the workpiece carrier 60 has a boss 64 that projects outwardly from the workpiece carrier. The edge 74 of the boss is preferably beveled to ease the engagement of the boss with the opening 36 in the engraving table 24. The boss 64 and opening 36 have substantially the same size and shape.

Figure 8:
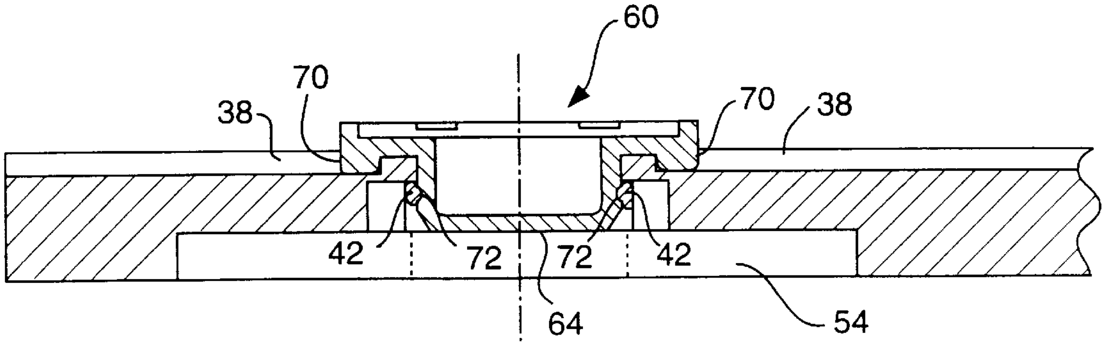
FIG. 8 is a cross-sectional view of the workpiece carrier in position on the engraving table.

As shown in FIG. 7, there are a pair of indentations 72 on either side of the boss 64. The indentations are rounded and are positioned to engage the spring pins 42 in the engraving table when the boss 64 engages the opening 36. As shown in FIG. 8, when the workpiece carrier 60 is in position on the engraving table 24, the spring pins 42 engage the indentations 72 and further secure the workpiece carrier.

Figure 5:
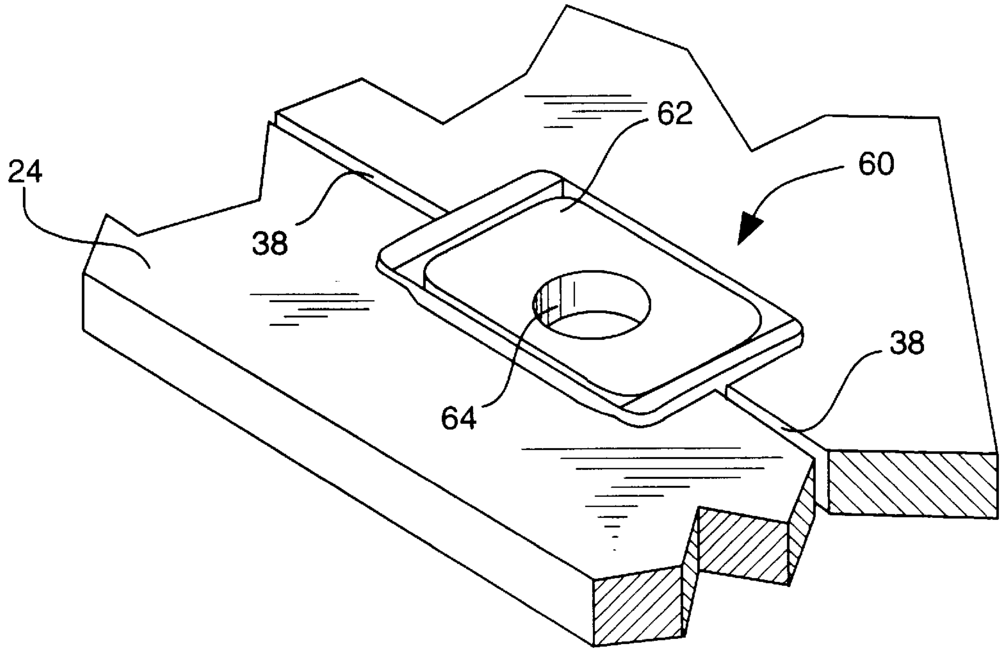
FIG. 5 is a partial perspective view of the workpiece carrier in position on the engraving table.
Figure 6A:
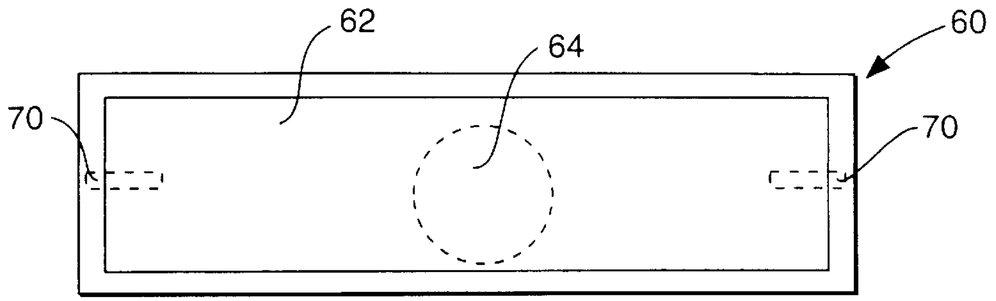
FIGS. 6(*a*), 6(*b*), 6(*c*), and 6(*d*) are top views of alternative embodiments of the workpiece carrier of the present invention.
Figure 6B:
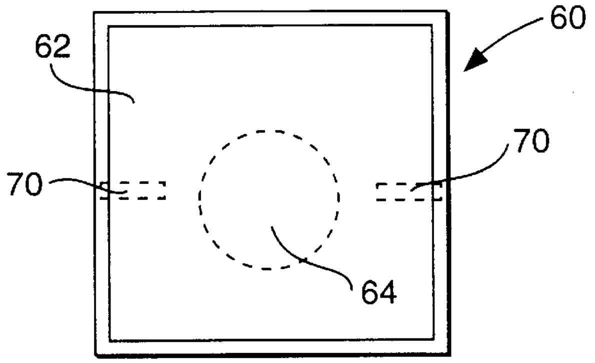
Figure 6C:
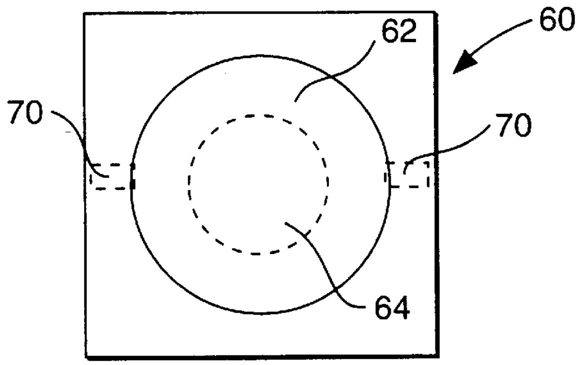

As embodied herein and as shown in FIG. 5, workpiece carrier 60 has a relief 62 designed to securely hold a workpiece. The present invention preferably provides a series of workpiece carriers, the shape of the relief 62 in each workpiece carrier being dependent on the workpiece to be held. As shown in FIGS. 6*a*, 6*b*, 6*c*, the outer dimensions of the workpiece carrier 60 may be of any shape befitting the shape of the workpiece. For example, in FIG. 6*a* the carrier holds a rectangular workpiece and square and circular workpieces are held in the workpiece carriers of FIGS. 6*b* and 6*c*, respectively. Each relief 62 must have substantially the same shape as the workpiece held therein so that the workpiece does not move within the workpiece carrier during the engraving operation.

Figure 6D:
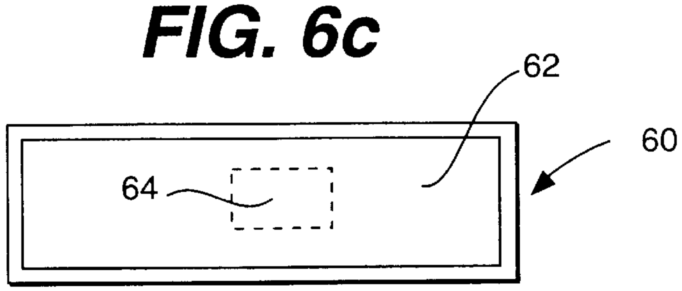

While the disclosed embodiment provides a singular boss having a circular cross section to engage the opening in the engraving table in order to position the workpiece, it is contemplated that many other configurations could perform the same function. For example, the workpiece carrier could have a boss with a polygonal cross section, as illustrated in FIG. 6*d*. Alternatively, the workpiece carrier could have multiple bosses that engage corresponding openings in the engraving table. Or, the workpiece carrier could have intersecting protrusions which mate with intersecting slots on the engraving table, where the intersection of the protrusions marks the center of the workpiece. Any number of different positioning structures can be developed and are considered to be within the scope of the present invention.

To further secure the workpiece carrier in place and to prevent movement/rotation during the engraving process, the engraving table 24 is provided with slots 38 that extend from a position adjacent opening 36 to the outer edges of engraving table 24. As illustrated in FIG. 7, the workpiece carrier has two tabs 70. The tabs are positioned at or adjacent the outer edge of the workpiece carrier and are aligned with the boss so that they will engage slots 38 in the engraving table. Because the opening 36 of the presently preferred embodiment is circular, the engagement of the tabs 70 with the slots on the engraving table 38 prevent the workpiece carrier from rotating around the circular boss when the workpiece is being engraved. This engagement with the engraving table at opposing sides of the workpiece carrier also provides further stability to the workpiece during the engraving process.

While the preferred embodiment discloses a single circular boss and two tabs to prevent the workpiece from rotating during the engraving operation, many other shapes and combinations will effectively perform the same function. For example, a boss having a polygonal or elongated shape will also help prevent rotation of the workpiece carrier. Multiple bosses on the workpiece carrier will perform the same function.

The first and second positioning structures of the disclosed embodiment are presently preferred because they allow flexibility in the size and shape of the workpiece carrier. The presence in the engraving table of an opening with two slots requires only that the workpiece carrier have a boss corresponding to the opening and tabs that are aligned to engage the slots. The distance between the boss and tabs is restricted only by the size of the engraving table. Thus, any size or shape of carrier may be used with this combination. In contrast, combinations of structures using multiple bosses are more limiting in that the distance between the bosses is fixed and each workpiece carrier must be at least as big as the distance between the bosses.

In accordance with the present invention, the engraving system includes an engraver that is mounted on a support structure such that the engraver is operable to engrave the workpiece positioned on the engraving table. In the presently preferred embodiment, the engraver is a scribe engraver although any type of engraver known in the art may be used.

As embodied herein and as best shown in FIG. 1, the engraver 12 is mounted in a housing 16. Any known method of moving the engraver in the Z-direction into and out of engagement with a workpiece may be utilized. In the disclosed embodiment, the engraver is mounted on a shaft that is connected to a lever arm 20. The lever arm is connected to a solenoid 18, which acts to move the engraver in the Z-direction. Further details of this disclosed embodiment are provided in a co-pending application entitled "Solenoid Driven Engraving System and Related Method" by Michael A. Mueller Ser. No. 09/054,416 filed on even date herewith, which application is hereby incorporated herein by reference. Other ways of moving the engraver in the Z-direction will be readily apparent to those skilled in the art. For example, a stepper motor combined with the lever arm or a stepper motor combined with a rack and pinion system would also be capable of moving the engraver in the Z-direction.

The operation of the engraving system of the present invention will now be described with reference to the accompanying drawings. All of the stepper motors in the engraving system are controlled by a central control system. This control system is used to receive the user's input and control all of the functions of the engraving process. The engraving system is equipped with means by which a user can select a certain workpiece from a variety of differently shaped workpieces and also select the design or message to be engraved on the chosen workpiece. Any of a number of means to perform this function will be readily apparent to those skilled in the art. In the preferred embodiment, a front-end software system driven by a touch-sensitive screen is used to accept the user's input and control the movements of the engraving machine. The user first selects a workpiece from the number of differently shaped workpieces to engrave and then inputs the characters and/or design to be engraved on the workpiece. The software system then coordinates the movements of the engraving machine to engrave the workpiece as desired by the user.

Before starting the engraving operation, a workpiece having a selected configuration must first be secured into a workpiece carrier having a relief of substantially the same shape. For example, a rectangular workpiece could be secured in the workpiece carrier of FIG. 6*a*. The workpieces may be already provided in respective workpiece carriers and displayed at the point of sale or, alternatively, the workpieces may be displayed and stored separate and apart from a carrier. In the latter case, the workpieces will be inserted into the workpiece carrier at a preliminary stage of the engraving process.

Figure 9:
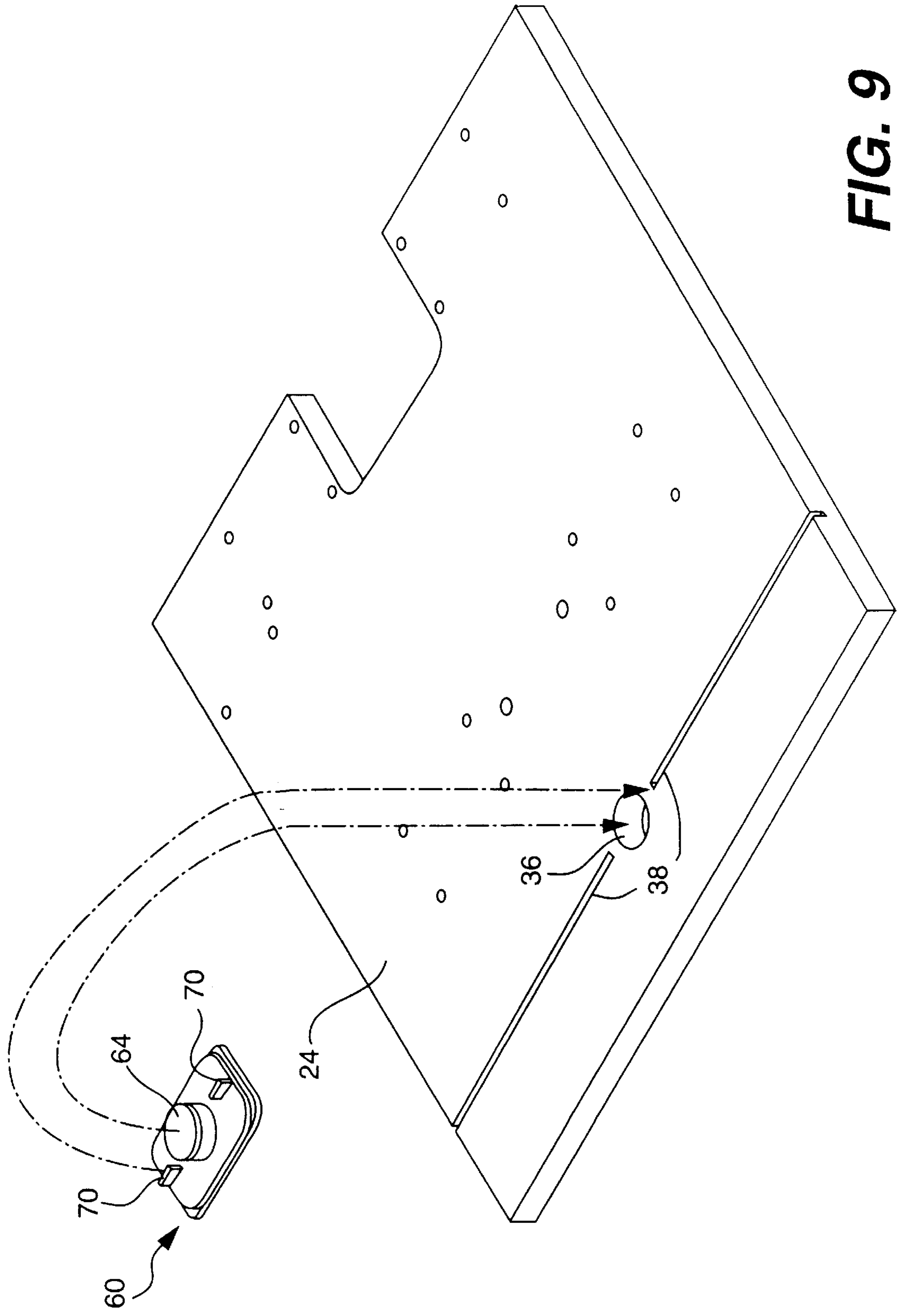
FIG. 9 is a perspective view of the workpiece carrier and engraving table of the present invention.

As illustrated in FIG. 9, the workpiece carrier 60 is positioned on the engraving table by engaging the boss 64 and tabs 70 of the workpiece carrier with the opening 36 and slots 38 of the engraving table. Referring to FIGS. 6 and 7, the boss has a pair of indentations 72 which engage the spring pins 42 when the boss is inserted into the opening 36 in the engraving table. The beveled edge 74 of the boss pushes the spring pins 42 outwardly into the open area 52. When the boss is fully inserted the spring pins 42 snap into the indentations 72, effectively securing the workpiece carrier to the engraving table. The Y-direction stepper motor 34 (referring to FIG. 1) is then activated to move the engraving table from the loading location to the engraving location. The engraving table may also be manually moved to the engraving location.

Because the workpiece is centered over the boss on the workpiece carrier, when the workpiece carrier is in place on the engraving table, the exact location of the center of the workpiece is known to the engraving system. Given the dimensions of the workpiece, the engraving system can then properly engrave the selected message or design into the workpiece. All of this can be accomplished with an operator having no engraving skills.

When the engraving is completed, the Y-direction stepper motor 34 moves the engraving table back to the loading location for easy removal of the workpiece carrier from the engraving table. Referring to FIGS. 6 and 7, the workpiece carrier 60 may be dislodged from the engraving table by providing an upward force with a finger or tool through a hole provided in cover 54 and through the opening 56 in the bottom of the engraving table. The upward force may be either manual or mechanical. The workpiece may then be removed from the workpiece carrier and the engraving operation is complete.

It will be apparent to those skilled in the art that various modifications and variations can be made in the method of the present invention and in construction of this engraving system without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An inscribing system, comprising:

a support table having a first positioning structure;

a plurality of workpiece carriers for positioning a plurality of workpieces having different configurations, each workpiece carrier having a relief configured to receive and hold a workpiece with a selected configuration and having a second positioning structure, the second positioning structure engagable with the first positioning structure to position the workpiece in a predetermined inscribing position on the support table; and an inscriber mounted on a support structure such that the inscriber is operable to inscribe the workpiece positioned on the support table.

2. The system of claim 1, wherein first positioning structure is an opening in the support table and the second positioning structure is a boss, the boss being dimensioned to be engagable with the opening.

3. The system of claim 2, wherein a spring pin is provided in the opening and the boss has an indentation that engages the spring pin to secure the workpiece carrier to the support table.

4. The system of claim 2, wherein the support table is moveable from a loading location to an inscribing location.

5. The system of claim 4, wherein the system further comprises:

a pair of support members that slidably support the support table;

a lead screw that engages the support table; and a stepper motor connected to the lead screw, wherein the stepper motor operates to turn the lead screw thereby moving the support table.

6. The system of claim 1, wherein each relief has substantially the same shape as the workpiece held therein.

7. The system of claim 6, wherein each of the plurality of workpiece carriers have a different configuration.

8. The system of claim 1, wherein the inscriber is an engraver and the support table is moveable in at least one direction when the engraver is in contact with the workpiece, such that the support table moves the workpiece relative to the engraver to engrave the workpiece.

9. The system of claim 2, wherein the boss on each workpiece carrier has a generally circular cross section.

10. The system of claim 2, wherein the boss on each workpiece carrier has a polygonal cross section.

11. The system of claim 2, wherein the boss has a beveled edge.

12. The system of claim 2, wherein the workpiece is centrally positioned on each workpiece carrier and the boss is centrally positioned on each workpiece carrier such that engagement of the boss with the support table opening centers the workpiece over the support table opening.

13. The system of claim 2, wherein each workpiece carrier has an outer edge and each workpiece carrier further includes a tab at or adjacent to the outer edge and the support table includes a slot, wherein said tab engages said slot to prevent each workpiece carrier from rotating about the boss during inscribing.

14. The system of claim 13, wherein the support table includes two slots, each of said slots extending outwardly from a location at or adjacent to the support table opening to an outer edge of the support table.

15. The system of claim 1, wherein the inscriber is an engraver and the support structure for the engraver includes a guide rail, a lead screw, and a stepper motor, such that the engraver is mounted on the guide rail and the stepper motor rotates the lead screw, said lead screw operating to move the engraver along the guide rail.

16. An inscribing system, comprising:

a plurality of workpiece carriers for positioning a plurality of workpieces having different configurations, each workpiece carrier having a relief configured to receive and hold a workpiece with a selected configuration and having a first positioning means for establishing a reference point on the workpiece carrier;

support means for supporting the workpiece carrier, the support means including a second positioning means for engaging the first positioning means, whereby engagement of the first and second positioning means positions the workpiece carrier into a predetermined inscribing position; and means for inscribing the workpiece when the workpiece is in the predetermined inscribing position.

17. The system of claim 16, wherein each workpiece carrier includes a means for preventing rotation of the workpiece carrier during inscribing.

18. A method of positioning a workpiece in an inscribing system in a predetermined manner, the method comprising the steps of:

providing a plurality of workpiece carriers, each workpiece carrier having a relief configured to receive and hold a workpiece with a selected configuration and having a first positioning structure;

securing the workpiece to be inscribed into the workpiece carrier;

engaging the first positioning structure of the workpiece carrier with a second positioning structure on a support table to position the workpiece carrier in a predetermined inscribing position on the inscribing table.

19. The method of claim 18, further comprising the step of moving said support table from a loading location to an inscribing location.

20. The method of claim 19 further comprising the step of inscribing the workpiece by moving an engraver into contact with the workpiece and engraving the workpiece.

21. An inscribing system, comprising:

an inscriber for inscribing a workpiece;

a support having a first positioning structure; and a workpiece carrier configured to receive the workpiece, the workpiece carrier having a second positioning structure engagable with the first positioning structure to substantially align the center of the workpiece carrier with the first positioning structure and position the workpiece in a predetermined inscribing position on the support.

22. The system of claim 21, wherein the first positioning structure is an opening in the support and the second positioning structure is a boss, the opening configured to receive the boss.

23. The system of claim 21, wherein the first positioning structure further includes at least one tab and the second positioning structure includes at least one groove configured to receive the at least one tab.

24. The system of claim 21, wherein the workpiece carrier includes a relief configured to receive and hold the workpiece.

25. An inscribing system, comprising:

a support table having an opening;

a workpiece carrier having a boss engageable with the opening to position a workpiece in a predetermined engraving position, the boss including an indentation;

a spring pin disposed in the opening and configured to engage the indentation of the boss to secure the workpiece carrier to the support table; and an inscriber mounted on a support structure such that the engraver is operable to inscribe the workpiece positioned on the support table.

26. The inscribing system of claim 1, wherein the depth of the relief is substantially equivalent to the thickness of the workpiece.

* * * * *